Re. 16,058

April 28, 1925.

H. I. JORDAN

FABRICATED WOOD SHAFT

Original Filed Nov. 25, 1921

Inventor
Harry I. Jordan
By Ellis Spear Jr.
Attorney

Reissued Apr. 28, 1925. Re. 16,058

UNITED STATES PATENT OFFICE.

HARRY IVORY JORDAN, OF AUBURN, MAINE, ASSIGNOR TO LAMINO MANUFACTURING COMPANY, A CORPORATION OF MASSACHUSETTS.

FABRICATED WOOD SHAFT.

Original No. 1,457,528, dated June 5, 1923, Serial No. 517,547, filed November 25, 1921. Application for reissue filed January 25, 1924. Serial No. 688,625.

*To all whom it may concern:*

Be it known that I, HARRY I. JORDAN, a citizen of the United States, residing at Auburn, in the county of Androscoggin and State of Maine, have invented certain new and useful improvements in a novel fabricated wood shaft of great general utility and adapted for many purposes where suitable natural growths are difficult to obtain, such as for golf-club shafts, of which the following is a specification.

My present invention in the specific embodiment selected as illustrative of the broader invention is designed as an improvement on my application Serial No. 496,343, filed August 29, 1921, covering such a shaft made up of what is technically known as ply-wood with the plane of the layers at right angles to the direction of swing of the club.

It is well known that hickory suitable for shafts for drivers and other golf clubs has become very scarce and expensive.

The object of my present invention is to produce a fabricated wood which may be cheaply manufactured and which will approach in quality, if not excel, the hickory now so much sought for such shafts.

Fabricated wood shafts have been made with a central layer arranged at right angles to the swing of the club with auxiliary sections on either side of said central layer of triangular and other forms of cross-section.

This so-called ply-wood of which my original shaft was formed was made up of a plurality of layers of veneer pressed together and glued with the grain of alternate plies or layers disposed at right angles to each other.

In building up a shaft of this character, I found from experience that those layers in which the grain of the shaft was at right angles to the length of the shaft while they had a tendency to prevent the warping of the shaft and to resist torsion tended also to diminish the strength and the resiliency of the shaft.

According to my present invention, instead of alternately crossing the direction of the grain in the various layers, I have found that if the plies are pressed together with the grain in all of them extending longitudinally in the same general direction, I obtain a shaft which is stronger than the average solid shaft and has greater resiliency at that portion of the shaft which is adjacent to the head.

It is this resiliency at this particular portion of the shaft which holds the head in contact with the ball while the latter is springing away from the face of the club, and the greater this resiliency, the greater the impulse which will be given to the ball in addition to the velocity of the club due to its swing.

I have found that with a shaft constructed as I have described, namely, with the grain of all the layers extending longitudinally in the same general direction, I am able to vary the quality of the shaft by turning it into various positions in the socket of the head and also by varying the thickness of the several layers.

Thus, when the plies are in the same plane as the swing of the club, the shaft is stiffer than when they are at right angles with the plane of the swing. When the layers are at right angles to the swing of the shaft the latter is in its most flexible position. In various positions between these two, different degrees of stiffness and different resistances to torsion may be brought out in my improved shaft.

By running the grain of all layers in the same general longitudinal direction, the grain of each layer may be made to cross at a greater or less angle the grain of adjacent layers and in that manner the grain will be securely knit together or interwoven so that the shaft thus built up will have a great degree of toughness as compared with a solid wooden shaft of best quality hickory, the material recognized as most suitable for golf clubs at the present time.

My shaft may be made up of veneer cut from various kinds of logs, preferably from hickory, so that when fabricated as I have described, it will be equal to or better than hickory of the finest grade and far less expensive to manufacture.

I have illustrated my invention by means of the accompanying drawing in which.

Figure 1:
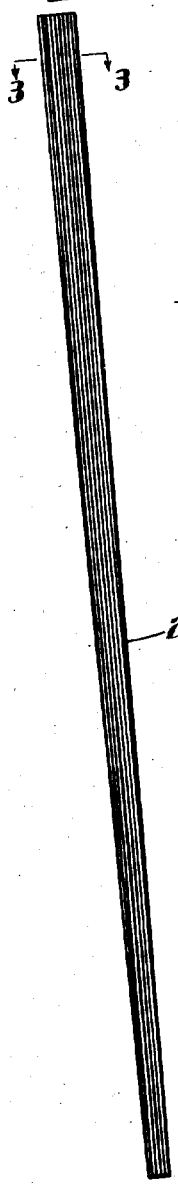
Fig. 1 is a plan of the shaft.
Figure 2:
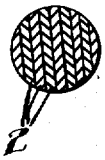
Fig. 2 is a cross section on the line 1—1, Fig. 1.

Referring to the drawing, the shaft is built up of plies or layers of veneer 2 cut from the surface of the log by a suitable veneer lathe, the strips being stuck together and compressed under heavy pressure.

Figure 3:
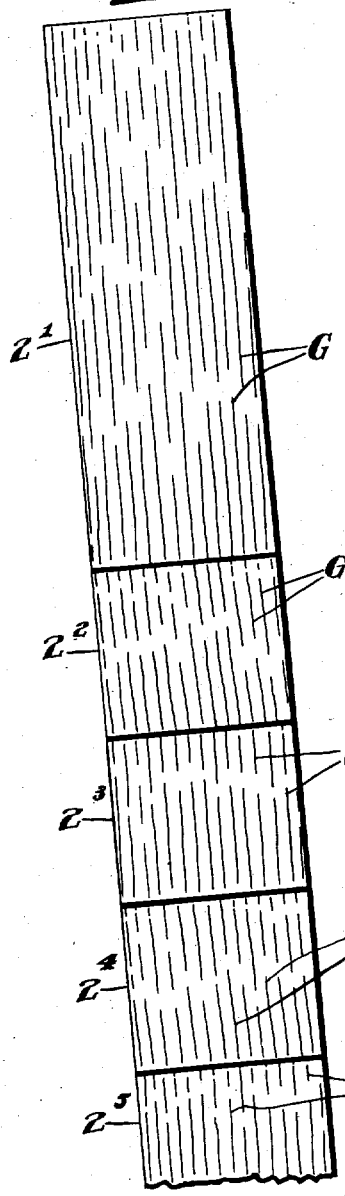
Fig. 3 is a view of a slab in accordance with my invention with the layers successively cut away to show the interweaving of the grain.

The result is a homogeneous wood body having very great strength and resiliency which can be built at a price far less than the cost of hickory. In such a wood body the fibres G of the several layers 2 while all generally longitudinal are relatively knit or interwoven as illustrated in Fig. 3. In this figure the veneer strips $2^1$, $2^2$, $2^3$, $2^4$, are shown as cut away slightly to indicate this grain.

Such a material is found to have very great strength and is adapted to a golf shaft as the available resiliency and the uniformity of the grain makes for great novelty in the article itself.

The material is sawed or turned and worked down to the form of a shaft exactly like any other wooden shaft.

What I therefore claim and desire to secure by Letters Patent is:—

1. A shaft for golf clubs substantially the entire body of which is made up of a plurality of relatively thin layers of wood veneer cemented and compressed together with the grain of the wood in all the layers extending generally longitudinally of the shaft.

2. A shaft for golf clubs comprising a plurality of relatively thin layers of wood disposed laterally thereof, and cemented face to face, the grain of the wood of each layer extending generally longitudinally of the shaft but at slight angles to each other.

HARRY IVORY JORDAN.

Witnesses:

MARIAN F. WEISS,
ELSIE F. DYER.